(No Model.)
S. C. SHEPARD.
SPEED INDICATOR FOR SHAFTS, PULLEYS, AND AXLES.
No. 324,042. Patented Aug. 11, 1885.
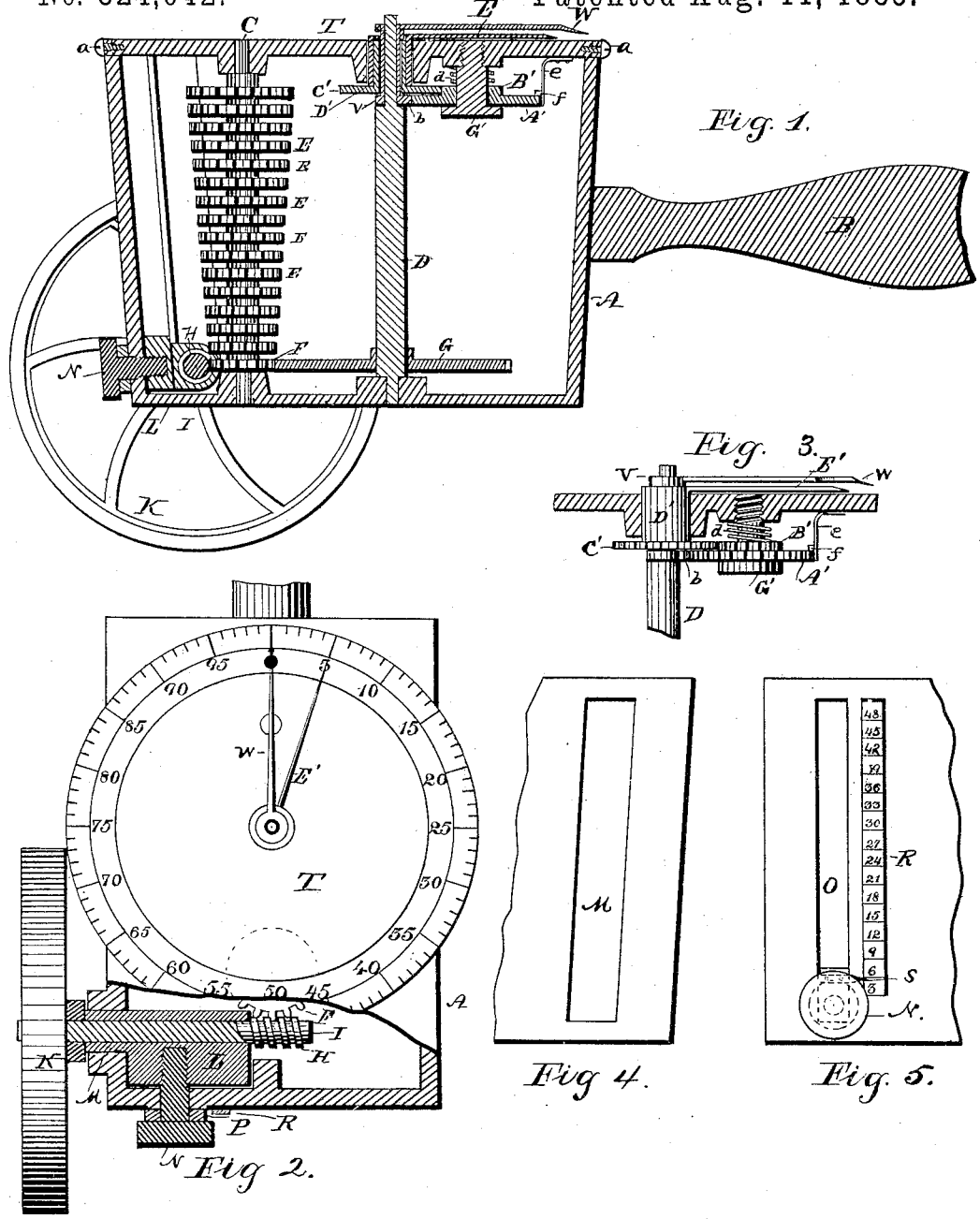
WITNESSES
T. J. Hudson
C. L. Emmons
INVENTOR
S. C. Shepard
By his Attorney
D. W. Sinsabaugh
N. PETERS, Photo-Lithographer, Washington, D. C.

UNITED STATES PATENT OFFICE.

SYLVANDER C. SHEPARD, OF AKRON, OHIO, ASSIGNOR OF ONE-HALF TO JOHN RAWLING, OF SAME PLACE.

SPEED-INDICATOR FOR SHAFTS, PULLEYS, AND AXLES.

SPECIFICATION forming part of Letters Patent No. 324,042, dated August 11, 1885.

Application filed January 21, 1885. (No model.)

*To all whom it may concern:*

Be it known that I, SYLVANDER C. SHEPARD, a citizen of the United States, residing at Akron, in the county of Summit and State of Ohio, have invented certain new and useful Improvements in Speed-Indicators, of which the following is a specification, reference being had therein to the accompanying drawings.

My invention relates to improvements in machines for indicating the speed of shafts, wheels, &c.

The object of my invention is to provide a device by which the speed of shafts, wheels, &c., of different diameters may be indicated, as will more fully appear hereinafter.

Figure 1 is a longitudinal vertical sectional view of my device. Fig. 2 is a top or plan view with a portion of the dial or index plate broken away. Fig. 3 is a detached view of the shafts and wheels which operate the index-hands. Figs. 4 and 5 are views of the sides of the box, showing the slots in which the axle and worm-gear are adjusted.

A indicates a box, of any suitable size and form, provided with a handle, B, and in which are mounted, in suitable bearings in the dial-plate and in the bottom of the box, the shafts C D. The shaft C is provided with a series of pinion-wheels, E, which increase in diameter from the bottom to the top, the purpose of which will be more fully explained hereinafter. The lower pinion-wheel, F, of the series meshes with the pinion-wheel G on the shaft D and imparts motion thereto. The shaft C is driven by a worm-gear, H, on the inner end of shaft I, the outer end of shaft having secured rigidly thereto the wheel K. The shaft I is mounted on an adjustable box or bearing, L, one end of which passes through the slot M in the side of the box. The box or bearing L is adjusted so that the worm-gear H will mesh with any one of the series of pinion-wheels E by means of the set-screw N, which passes through the slot O, the set-screw being provided with a washer, P.

R is a scale or index secured to the side of the box near the slot O, and indicates the size of the pinion-wheel E which lies behind it, and when the speed of wheels or shafts of different diameters is to be tested the bearing-block, with the shaft I and wheel K, is raised or lowered to the desired point and secured in such position by the set-screw, the pointer S being brought onto the proper line to insure the perfect registering of the worm-gear I with the proper pinion E. The upper end of the shaft D extends through the dial-plate T, which forms the top of the box, said dial-plate being held rigidly in its place by screws *a a*.

V is a sleeve or ferrule secured to the top of the shaft D, to the upper end of which is secured the index-hand W. The bottom of the sleeve V is flanged and provided with a single tooth, *b*, which meshes with the teeth of the pinion-wheel A', and moves said pinion-wheel A' one step or tooth at each revolution of the shaft D. The hub of the pinion-wheel A' is provided with teeth, so as to form a pinion-wheel, B'; or a separate pinion may be mounted on the same pin with the pinion-wheel A'. The pinion B' meshes with and imparts motion to the pinion-wheel C', which is secured to the sleeve D' on the top of the shaft D. The index-hand E' is secured to the sleeve D'. It will be noticed that by each revolution of the shaft D and index-hand W the pinion-wheels A' B' C' are moved one notch and the index-hand E' moved to register one line on the index-plate. The pinions A' B' are supported by a pin or screw-bolt, G', which is screwed into the under side of the dial-plate, and a spiral spring, *d*, serves to hold the pinions B' and A' against the head of the bolt.

*e* is a strap-spring secured to the under side of the dial-plate, and is provided with a lug, *f*, at its lower end, which engages with the teeth of the pinion A' and holds the same in position.

The operation of my device is as follows: The wheel K being placed in contact with the revolving shaft or wheel to be tested, the frictional contact therewith imparts the same speed to the wheel K, which in turn communicates it to the index-hands E' and W through the intermediate gearing heretofore described, the index-hand E' indicating the number of revolutions the index-hand W has made within a certain period of time.

Having thus described my invention, what I claim, and desire to secure by Letters Patent, is—

1. The combination, with the shaft C, its pinions, and adjustable driving mechanism, of the shaft D, having a ferrule or sleeve, the spur-wheel G, gearing with the pinion on the shaft C, the ferrule or sleeve V, provided with a tooth, b, and the pinion-wheel A', whereby at each revolution of the shaft D the pinion A' is moved around one notch, substantially as specified.

2. The box or bearing L, carrying the worm-shaft H and wheel K, adapted to be raised and lowered in guides in the box, in combination with the set-screw N, index-finger S, and index-plate R, as set forth.

In testimony whereof I affix my signature in presence of two witnesses.

SYLVANDER C. SHEPARD.

Witnesses:
F. B. HARGETT,
O. L. SADLER.